(12) United States Patent
Coker et al.

(10) Patent No.: US 12,370,441 B2
(45) Date of Patent: Jul. 29, 2025

(54) UNDEDICATED LOBBY SERVERS

(71) Applicant: DISCORD INC., San Francisco, CA (US)

(72) Inventors: Michael Coker, Richardson, TX (US); Mark Lohstroh, Plano, TX (US)

(73) Assignee: DISCORD INC., San Francisco, CA (US)

( * ) Notice: Subject to any disclaimer, the term of this patent is extended or adjusted under 35 U.S.C. 154(b) by 413 days.

(21) Appl. No.: 18/068,812

(22) Filed: Dec. 20, 2022

(65) Prior Publication Data

US 2024/0198218 A1    Jun. 20, 2024

(51) Int. Cl.
| | | |
|---|---|---|
| *A63F 13/352* | (2014.01) | |
| *A63F 13/48* | (2014.01) | |
| *A63F 13/73* | (2014.01) | |
| *A63F 13/798* | (2014.01) | |
| *H04L 67/131* | (2022.01) | |

(52) U.S. Cl.
CPC ............ *A63F 13/352* (2014.09); *A63F 13/48* (2014.09); *A63F 13/73* (2014.09); *A63F 13/798* (2014.09); *H04L 67/131* (2022.05)

(58) Field of Classification Search
CPC ................................ A63F 13/48; A63F 13/352
See application file for complete search history.

(56) References Cited

U.S. PATENT DOCUMENTS

| | | | | |
|---|---|---|---|---|
| 6,530,840 B1* | 3/2003 | Cuomo | ................. | A63F 13/352 463/42 |
| 8,092,308 B2* | 1/2012 | Hartmann | ............... | G07F 17/32 463/42 |
| 8,560,707 B2* | 10/2013 | Jacob | .................. | H04L 67/1051 709/228 |
| 8,663,011 B2* | 3/2014 | Kirmse | ................... | H04L 51/04 463/42 |
| 9,162,143 B2* | 10/2015 | Olomskiy | ............. | A63F 13/533 |
| 2003/0204566 A1* | 10/2003 | Dhupelia | .............. | A63F 13/352 709/205 |
| 2006/0287097 A1* | 12/2006 | Moshal | ............... | G07F 17/3288 463/42 |
| 2007/0298879 A1* | 12/2007 | Kobayashi | .............. | A63F 13/48 463/31 |
| 2015/0018094 A1* | 1/2015 | Watari | .................. | A63F 13/355 463/31 |
| 2017/0087464 A1* | 3/2017 | Perry | ..................... | A63F 13/352 |
| 2017/0354878 A1* | 12/2017 | Posin | ...................... | A63F 13/35 |
| 2018/0193742 A1* | 7/2018 | O'Connor | ............ | H04L 69/329 |
| 2024/0033647 A1* | 2/2024 | Shaya | .................. | A63F 13/798 |
| 2024/0198218 A1* | 6/2024 | Coker | .................. | A63F 13/798 |

* cited by examiner

*Primary Examiner* — Jay Trent Liddle

(74) *Attorney, Agent, or Firm* — Polsinelli PC

(57) ABSTRACT

The present technology provides a lobby system including lobby servers and game servers, whereby the lobby server functions as the hub for all connected users for an entire server. The single lobby server processes all incoming traffic but is largely unaware of the actual logic & data for the game that is being played. Its main function is to provide basic operations such as listing games, listing users, and providing game state change notifications to users. Game specific requests get forwarded from the lobby server to the game server over HTTP. Any relevant game state is then returned to the user and the lobby maintains a subset of game's state information in order to provide users a preview of all the games that are being played on the community server.

20 Claims, 8 Drawing Sheets

UNDEDICATED LOBBY SERVERS

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. Some social networks have moderators that moderate the content in their respective social networks or online communities. While social networks can provide entertainment, networking, commercial, or informational value, they are also subject to various challenges. For social networks that provide a gaming aspect, there is a need to effectively run a multitude of on-demand games in a way that allows for an ever-growing list of new games to be added as available games. In addition, there is a need for a multitude of game sessions to be hosted on-demand as well. All the while, there is a need that the on-demand games and game sessions are hosted efficiently with respect to storage and server usage.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
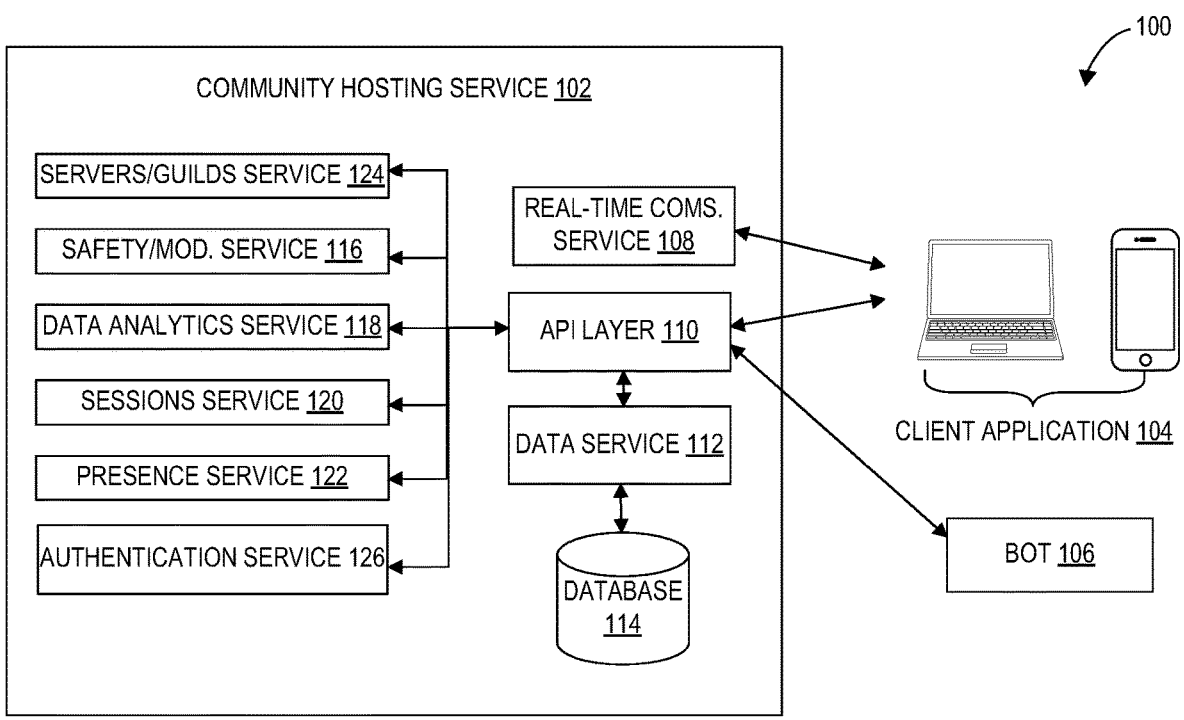
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art to support backend needs for near-real time, multiplayer games, in a serverless, low cost, and highly scalable fashion. 'Serverless' refers to a cloud-native development model that allows developers to build and run applications without having to manage servers. In some cases, the technology also supports the persistence of game state to handle asynchronous in-progress, game sessions, and a visual history of completed games.

A traditional approach to building a backend architecture to support real-time games is to leverage a dedicated server model, which is generally more costly to commission. Dedicated servers also do not inherently have support for game state persistence and generally require a more "hands-on" approach to scaling in order to handle increases/decreases in usage.

As described herein, one aspect of the present technology is to use undedicated servers, such as durable objects, which are a way of defining a serverless function as an instance of a javascript (JS) class and can be instantiated instantaneously and completely autonomously. Servers, such as durable objects, may provide low-latency coordination and consistent storage and a given namespace can support essentially unlimited servers, with each server having access to a transactionally consistent key-value storage API. The undedicated servers may consist of two components: a class that defines a template for creating servers and a script that instantiates and uses those servers. The class and the script are linked together with a binding.

Undedicated servers such as durable objects may be essentially "serverless" components that are unique, where the undedicated servers have an associated consistent key value storage, and can handle websockets that allow uni- and/or bi-directional communication from the client to the undedicated server and vice versa. The fact that requesting an undedicated server by ID will resolve to the same instance with the same associated storage, means that the undedicated server can be leveraged to mimic the behavior of a dedicated server with a database.

As such, one aspect of the present technology is to use lobby servers and game servers. The lobby server may function as the hub for all connected users for an entire server (or guild, see below for more details). The single lobby server may process all incoming traffic, but may be largely unaware of the actual logic & data for the game that is being played. Its main function may be to provide basic operations such as listing games, listing users, and providing game state change notifications to users.

In some cases, game specific requests get forwarded from the lobby server to the game server over HTTP. Any relevant information (e.g. game state) may then returned to the user. The lobby server may maintain a subset of game state information in order to provide users a preview of all the games that are being played on the community server.

In some cases, while there is one lobby server per community server, there are many game servers per lobby server. One game server may be associated with a particular game. Each game server understands the specific rules and logic that are used to play a given type of game, and as such, is the only object that is allowed to modify a game state. The fact that the lobby server is game agnostic allows it to have a common API for all games, meaning it can orchestrate incoming requests and forward them to game servers of any type.

While the following will describe lobby servers and game servers, a more general lobby and layered game system follows a similar architecture and is one aspect of the present technology. A lobby server may be synonymous to a lobby system, namespace, storage layer, or server that routes game state or game moves to respective game systems, namespace, storage layers, or logic servers. Furthermore, the messages sent to the lobby system share a same game agnostic protocol, allowing new games and new game sessions to be pipped through a same lobby system.

Although the present disclosure broadly covers the use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a community server (also referred to as a guild) to host members interacting around one or more channels. A community server (or guild) is a user-created environment supporting a community. A community server is generally configured with one or more channels which are generally created around topics or sub-topics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a community server at the community hosting service 102. In some embodiments, this will be performed by the client application 104 calling the API layer 110 requesting to create a new server. The API layer 110 can then interact with servers/guilds service 124 to create the community server by providing the community server with a unique identifier and associating various configurations requested by the user account. Once the community server is created, the user account that created the community server can be considered the owner and/or admin for the community server. The servers/guilds service 124 can record the information about the community server using data service 112 to store information about the community server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the community server. Additionally, server administrators can delegate privileges to other user accounts to be administrators, and administrators can also create or invite bots 106, such as a chatbot, to perform some administrative actions.

In addition to approving user accounts to join a community server, administrators can also set up various safety or content moderation policies. In some embodiments, those policies are enforced by user accounts with the administrator role for the community server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a community server might integrate a YOUTUBE channel, a TWITCH feed, or a TWITTER feed into one or more channels of the community server when the content of those channels or feeds are relevant to the channel. In some embodiments, a community server can follow a channel offered by another server supported by the community hosting service 102.

In addition to hosts, user accounts that are members of a community server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a community server. Additionally, the servers/guilds service 124 can also support various functions to those user accounts that are members of a community server. For example, when an instance of client application 104 establishes a session using sessions service 120, the sessions service 120 can interact with servers/guilds service 124 to provide information regarding the community servers to which the user account belongs. The client application 104 can receive identifiers of all servers to which the user account operating the client device associated with client application 104 is a member. While the session is active, client application 104 can request updates regarding one or more of the community servers to which the user account operating the client application 104 belongs from servers/guilds service 124.

Community hosting service 102 also provides a safety/moderation service 116. As with any online community, community hosting service 102 occasionally needs to deal with user accounts issuing spam or inappropriate content. While administrators of community servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on the client application 104 or the computing device hosting the client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the community servers associated with the user account to the client application 104.

Thereafter, the client application 104 can request information regarding the community servers by using a session token that validates that the client application 104 is operating in an authenticated session.

The presence service 122 can be used to provide presence information regarding other members of a community server or a channel to which the user account belongs. Through the presence service 122, the client application can convey information about which user accounts are currently active in the community server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

Authentication service 126 may assist with receiving authentication (i.e., via OAuth 2) from a third-party application to receive a set of curated data, that is updated over time, pertaining to the third-party application user account. The authentication service 126 serves as a safety measures for the community hosting service 102 when facilitating real-world transactions, especially with regard to authenticating seller user accounts by giving buyer user accounts access to reliable information about the seller as well as restricting certain capabilities to authenticated sellers, as further described below.

FIG. 1 also illustrates a bot 106. The bot 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bots 106 can have their own user account and are authenticated using a token. Bots 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
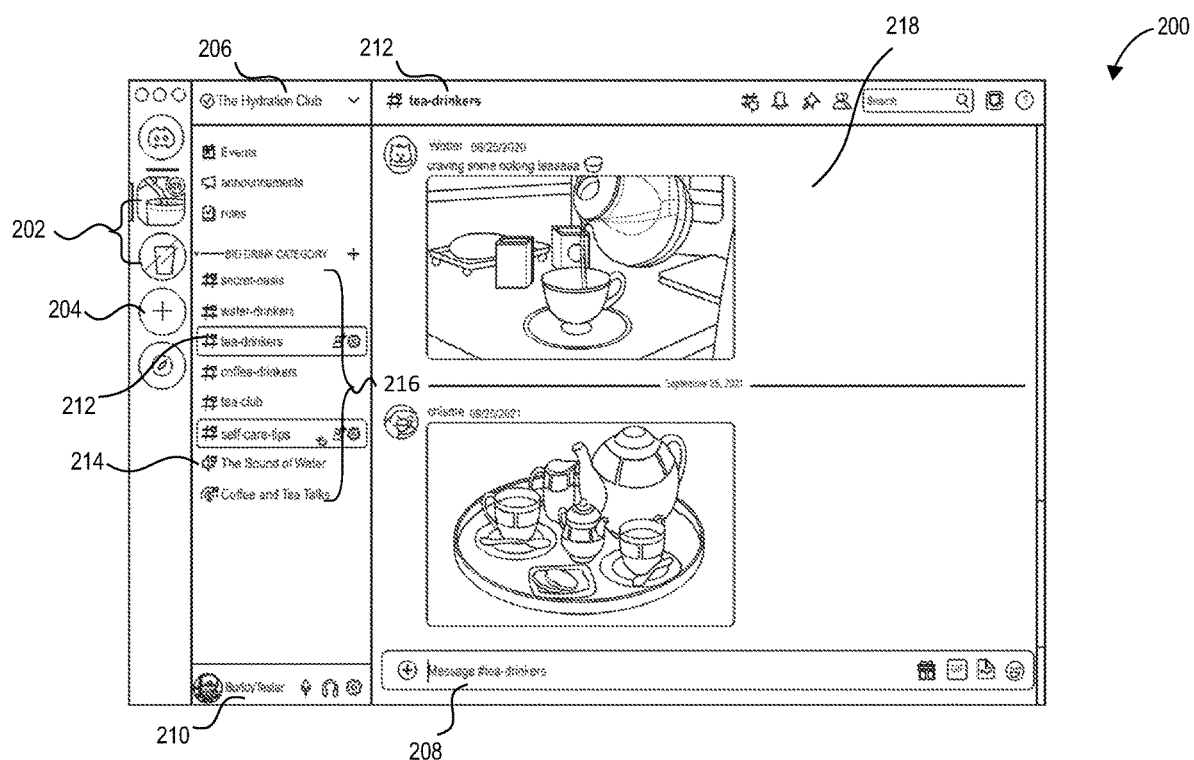
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 216 that are part of the community server hydration club server. One of the channels, entitled "tea drinkers" 212 is a non-real-time messaging channel. The message thread within the "tea drinkers" channel 214 can be shown within messaging pane 220. As illustrated in FIG. 2A, the messaging pane 218 is configured to present content such as text messages, images, emojis, recorded voice or video files, attachments, etc. A user can provide content to be included in the channel using input interface 208.

User interface 200 also includes a selectable option 204 to add additional servers. User interface 200 also includes a user account icon and controls 210.

Figure 2B:
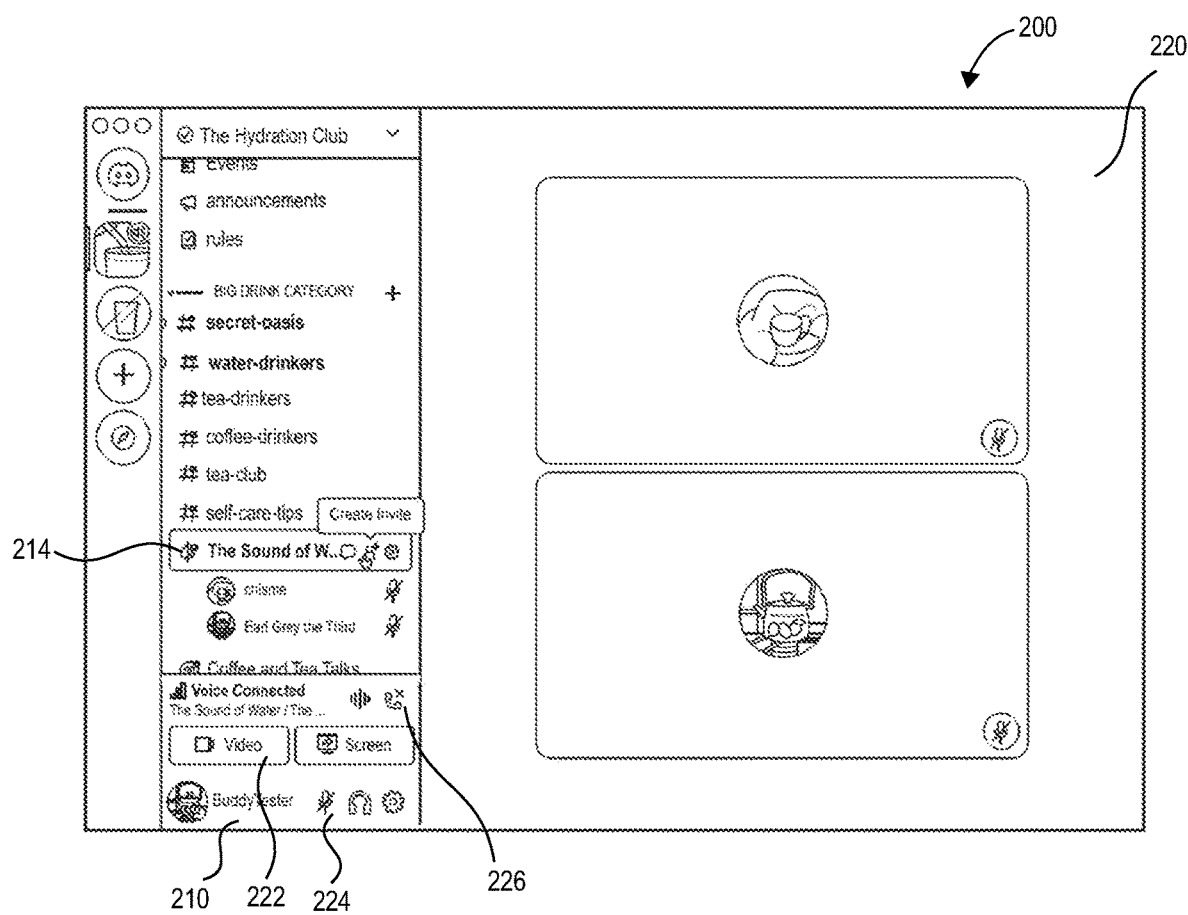
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and controls 210 show that the user accounts microphone 224 is muted. Additionally, the user account has options 222 to share their video or screen. The user account can also disconnect from the real-time communications using option 226.

Figure 3:
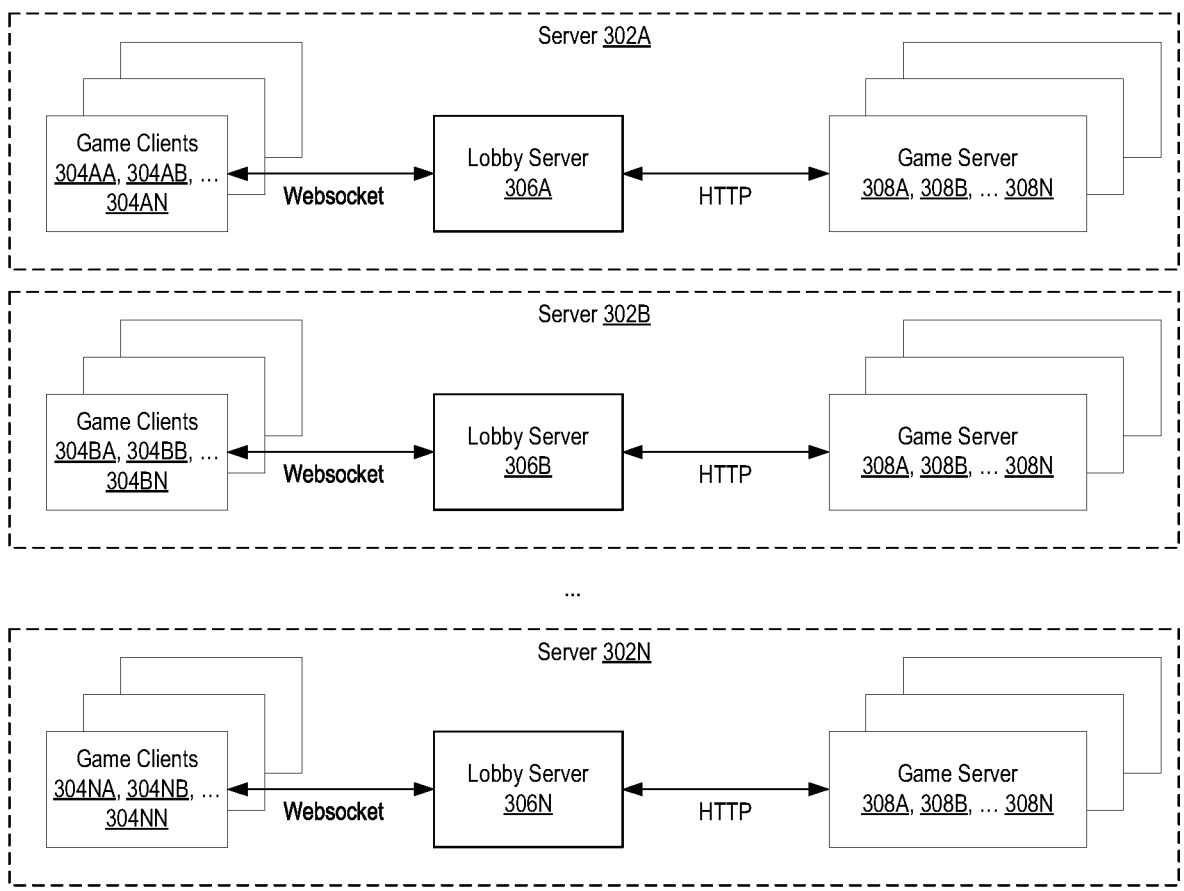
FIG. 3 illustrates an example diagram depicting a lobby server and multiple game servers per community server in accordance with some aspects of the present technology.

FIG. 3 illustrates an example diagram depicting a lobby server and multiple game servers per community server in accordance with some aspects of the present technology.

As mentioned above, in some embodiments, the community hosting service 102 may set up a plurality of community servers 302A, 302B, . . . 302N to host members interacting around one or more channels. One of the channels may be a voice channel and, in some cases, games are accessed through the voice channel. The users may give permissions to third-party applications to access the username, avatar, which servers the users are in, and other settings. Such data may then be used . . . .

Each server 302A, 302B, . . . 302N may be associated with a single lobby server 306A, 306B, . . . 306N, respectively. Each of the lobby servers 306A, 306B, . . . 306N may be in communication with respective game clients and game servers associated with each server. For example, for server 302A, the lobby server 306A may form websocket connections with game clients 304AA, 304AB, . . . 304AN. For server 302B, the lobby server 306B may form websocket connections with game clients 304BA, 304BB, . . . 304BN, and through server 302N, the lobby server 306N may form websocket connections with game clients 304NA, 304NB, . . . 304NN.

In addition, for example, for server 302A, the lobby server 306A may for HTTP connections with game servers 308A, 308B, . . . 308N. For server 302B, the lobby server 306B may for HTTP connections with game servers 308A, 308B, . . . 308N and through server 302N, the lobby server 306N may for HTTP connections with game servers 308A, 308B, . . . 308N. The game servers 308A, 308B, . . . 308N are associated with game logic associated with each game, the library of games which is shared among the community servers.

Therefore, depending on which games are active, the lobby servers 306A, 306B, . . . 306N may form connections with the appropriate game servers 308A, 308B, . . . 308N to receive a next game state. The lobby servers 306A, 306B, . . . 306N and the game servers 308A, 308B, . . . 308N may be generated at third-party services, such as Cloudflare, which may inform certain requirements such as the connections form between the lobby servers 306A, 306B, . . . 306N and the appropriate game servers 308A, 308B, . . . 308N be HTTP. For other services, the connections may use other protocols.

For example, for a first server having a set of members, there may be a set of in-progress game sessions for a number of different games. There may be a single lobby server associated with the first server, with a websocket connection to the client applications that are online and playing in the in-progress game sessions. Some of the game sessions may not have any online players and merely have a persisted game state stored at the single lobby server. For each game move received by the lobby server, based on the game ID stored in the message carrying the game move, the correct game server receives the game move and determines an updated game state based on their respective game logic.

FIG. 3 illustrates that for each server, there is a single lobby server associated with the community server and a plurality of game servers in connection with each lobby server. However, in some cases, there may be more than one lobby server associated with the community server. For example, different type of games may be associated with different lobby servers. Furthermore, in some cases, for non-asynchronous games, such as relay games, game moves may be sent directly to the respective game server while simultaneously connected to the lobby server.

While FIG. 3 appears to have the lobby servers and game servers within the bounds of the community servers, this is solely to illustrate that these aspects are associated with different servers. The lobby servers and game servers may be stored at third-party services, such as CLOUDFARE. Furthermore, the game clients may be associated with the different client applications of the user accounts that are members of each server and the game servers may be associated with the different games that are in-progress with each server.

Figure 4:
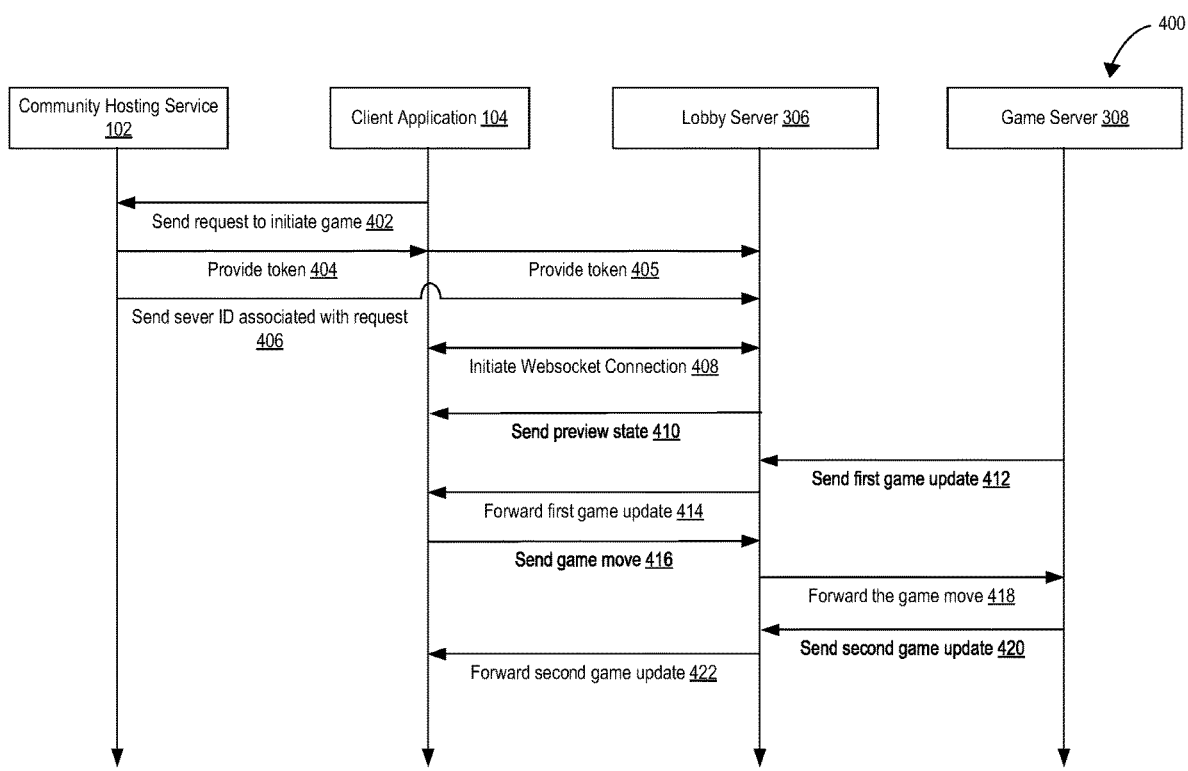
FIG. 4 illustrates an example sequence diagram for establishing and guiding gameplay at a client application through a lobby server and a game server in accordance with some aspects of the present technology.

FIG. 4 illustrates an example sequence diagram 400 for establishing and guiding gameplay at a client application through a lobby server and a game server in accordance with some aspects of the present technology.

A user associated with the client application 104 may choose to send (402) a request to initiate a game to the community hosting service 102. The community hosting service 102 may generate a token for the user account to join the game. The community hosting service 102 may provide (404) the token to the client application 104, which may then be provided (405) to the lobby server 306. In addition, the community hosting service 102 may generate a server ID associated with the request and send (406) the server ID to the lobby server 306. Based on the server ID and the token, a websocket connection may be initiated (408).

In some cases, once the request to initiate the game has been approved, a notification may be sent out to the user accounts that are playing games that a new user has joined. This notification may be based on the lobby server 306 sending out a status update to the other client applications through their respective websocket connections. The lobby server 306 not only keeps the latest game states of the in-progress games but also other keeps data and statistics, such as who is playing, leaderboard statistics, game statistics, etc. In addition, the user account may receive (410) a preview state that is used to generate a graphical user interface that serves as a "lobby" that displays a static preview of the latest game state of games played by the members of the community server.

Once the websocket connection is formed, the user account may enter a new game. In the game, for example, another player may make a first move. As such, the game server 308 may have received a game move from the other player and may determine a next game state based on its internal game logic. Based on the next game state, the game server 308 may send (412) a first game update to the lobby server 306, and the lobby server 306 may forward (414) the first game update to the client application 104.

For example, if the game is chess, the lobby server may receive a move of the white pawn to E4, which may be forwarded to a chess game server. The chess game server may determine that such a move kills an opposing black pawn. As such, the chess game server returns the updated game board with the white pawn at E4 and without the black pawn. The preview state for the game may be stored as a character string with the lobby server 306 for other user accounts to see the updated game state.

Next, the user account may move another piece, and that game move may be sent (416) to the lobby server 306 and forwarded (418) to the game server 308. The game server 308 may determine an update game state based on its game logic and send (420) a second game update to the lobby server 306, which will then forward (422) the second game update to the client application 104.

Figure 5:
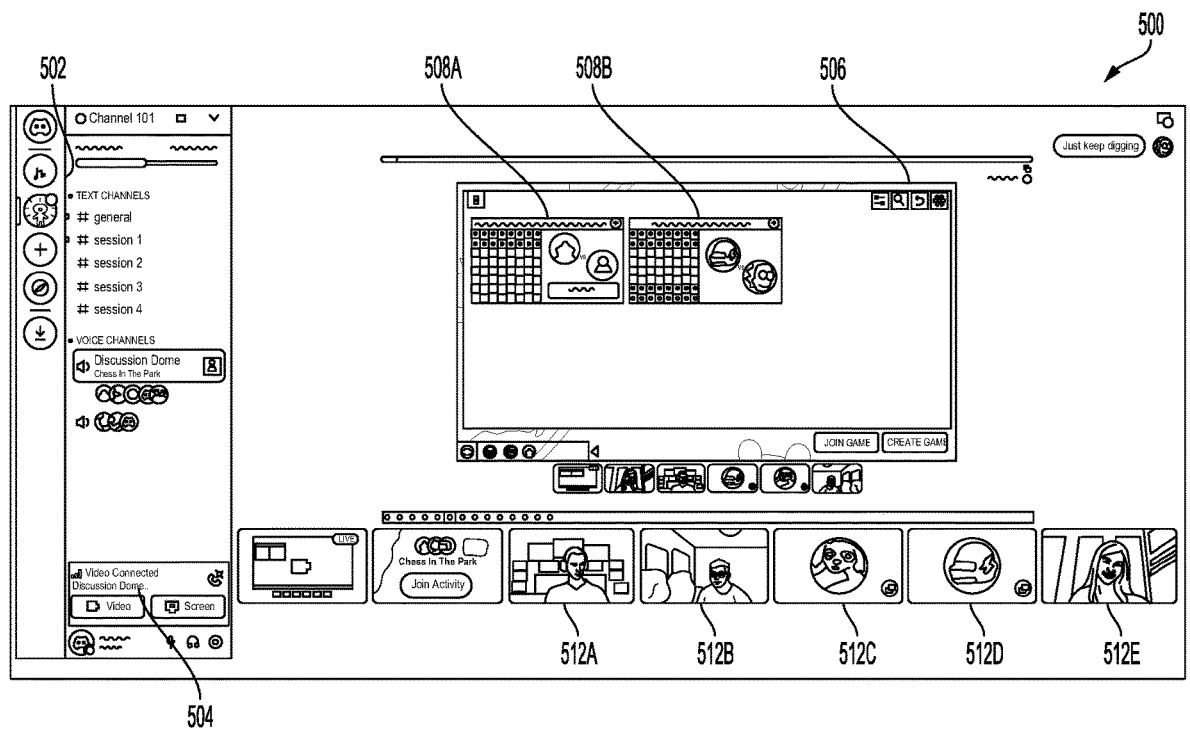
FIG. 5 illustrates an example of a graphical user interface (GUI) presenting a static preview of a most recent game state of games based on stored data at the lobby server in accordance with some aspects of the present technology.

FIG. 5 illustrates an example of a graphical user interface (GUI) 500 presenting a static preview of a most recent game state of games based on stored data at the lobby server in accordance with some aspects of the present technology.

The GUI 500 depicts a "lobby" that includes multiple ongoing games associated with a particular server 502. As mentioned above, games may be accessed via a voice (and/or video chat) channel 504 that presents the "lobby" 506 as a separate video screen 508. As FIG. 5 depicts, a number of other user accounts in the voice channel may have their own respective video screen 512A-512E. These video screen may display a video streamed from a camera or when the video is turned off, may show an avatar. A voice or audio stream may also be connected. Furthermore, the separate video screen 506 of the "lobby" may include the various static game previews for each pending game.

In some cases, no other user account may be connected because no other user account is online. For asynchronous games such as chess, it is not an issue and users may make their move and leave the game without having interacted with their opponent in real-time. However, when both players are online at the same time, the players may communicate via the video/voice channel 504. Furthermore, the user account does not need to be playing a game in order to view the "lobby" and the user account may join games as a spectator.

Figure 6:
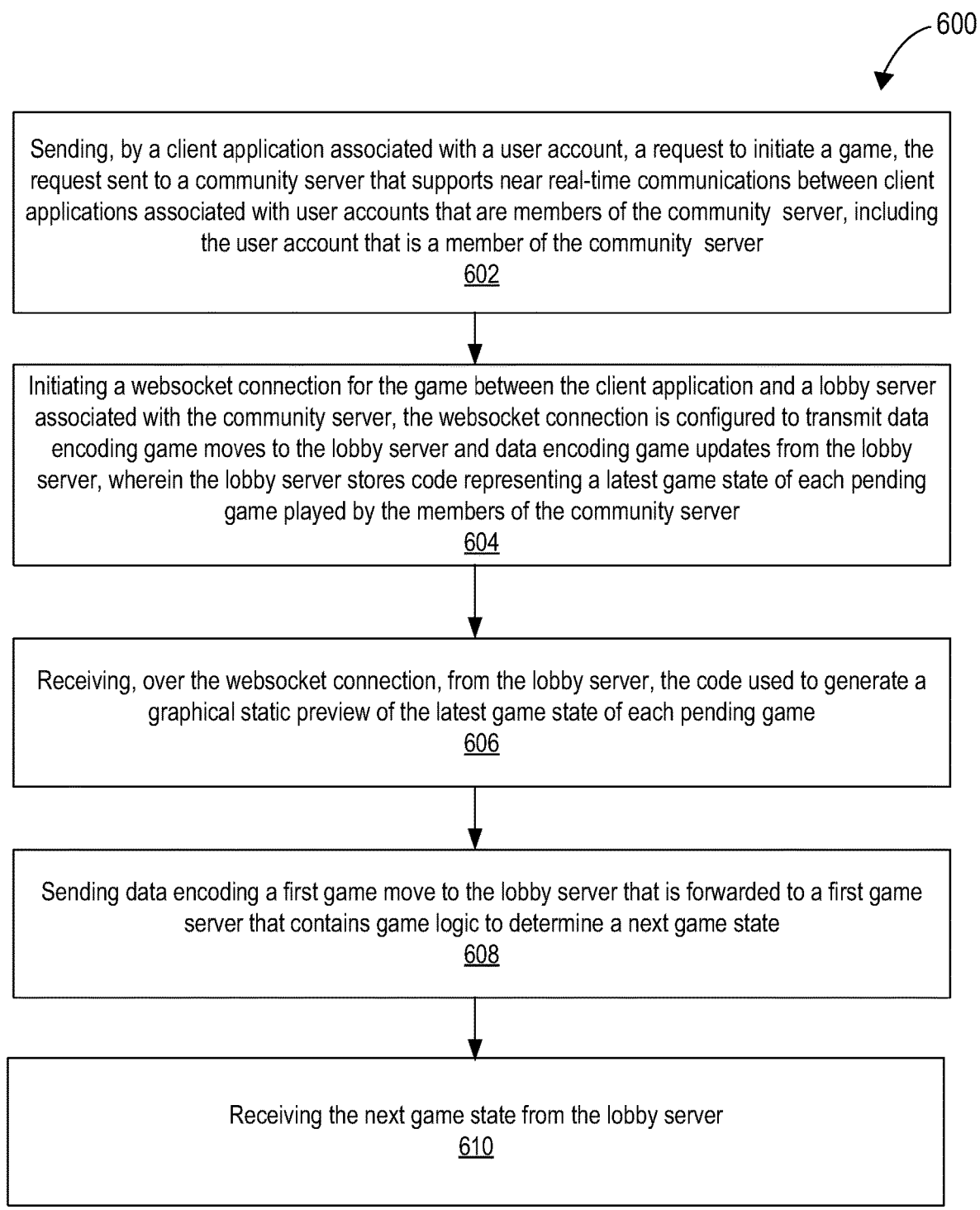
FIG. 6 illustrates an example flowchart diagram for generating a static preview of a latest game state stored data at the lobby server for games reserved for the members of the community server in accordance with some aspects of the present technology.

FIG. 6 illustrates an example flowchart diagram for generating a static preview of a latest game state stored data at the lobby server for games reserved for the members of the community server in accordance with some aspects of the present technology.

Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes sending, by a client application associated with a user account, a request to initiate a game at block 602. The request sent to a community server may support near real-time communications between client applications associated with user accounts that are members of the community server, including the user account that is a member of the community server. For example, the client application 104, illustrated in FIGS. 1 and 4, may send the request to initiate the game. The game may include simple asynchronous games such as checkers or chess and/or synchronous relay games such as virtual mini-golf.

In some cases, when the game client opens the game, the game client may request a full game state as opposed to just the preview state that the lobby server stores. The full state may be stored in the game server, and the lobby server may broker that request between the game client and the game server.

As mentioned above, using servers, such as durable objects, is only one way to implement a lobby system that is in communication with a separate game logic service. For example, durable objects may not be ideal for twitch-based games; however, the lobby system may still be used for twitch-based games. The client applications may be connected to the lobby system that supports user listings, game listing, join events, move events, without dealing with any game logic. Any mutation of the game state occurs via the logic/game portion is forward to the respective game service, which then determines the changed game state (did a piece get captured, did a piece get promoted, did the game end) and mutates the game state and returns the new state to the lobby system. The state can be a basic string or any game state that the game client understands.

In some cases, the client application 104 may receive a token from the community hosting service 102 that authenticates the user account to join the game. The community hosting service 102 may have sent a server ID associated with the request to the lobby server 306, and the client application 104 may have sent the token to lobby server 306. The lobby server 306 may be associated with a unique lobby ID, and the game may be associated with a game server 308, and a respective unique game ID that is used to route game moves through a correct lobby server 306 and to a correct game server 308.

In some cases, the games may be played by the members of the community server through a voice channel associated with the community server. Furthermore, the games played by the members of the community server may use a standard protocol shared between the games and recognized by the lobby server. In some cases, for the protocol messages that are sent, there may be rate limits that sets a maximum number of messages that can be sent from a specific client in a specific time period to prevent spamming or degradation of experience for other users.

According to some examples, the method 600 includes initiating a websocket connection for the game between the client application and a lobby server 306 associated with the community server at block 604. For example, the client application 104, illustrated in FIGS. 1 and 4, may initiate the secure connection. The websocket connection may be configured to transmit data encoding game moves to the lobby server and data encoding game updates from the lobby server. Furthermore, the lobby server may store code representing a latest game state of each pending game played by the members of the community server. In some cases, the websocket connection is initiated in response to a match between the token and the server ID. According to some examples, the method 600 includes receiving, over the websocket connection, from the lobby server, the code used to generate a graphical static preview of the latest game state of each pending game, at block 606. For example, the client application 104, illustrated in FIGS. 1 and 4, may receive the preview state to display the static preview.

The static preview may be displayed along with a leaderboard and/or other statistics and ranking associated with past and present game results. In some cases, the preview state for one or more games, such as chess, may be stored as a character string by the lobby server. The leaderboard and/or other statistics and ranking may be determined from logic stored in a separate server that the lobby server communicates with. Another example includes a first-person physics module that the lobby server may communicate with.

According to some examples, the method 600 includes sending data encoding a first game move to the lobby server that is forwarded to a first game server that contains game logic to determine a next game state, at block 608. For example, the client application 104, illustrated in FIGS. 1 and 4, may send the game move. According to some examples, the method 600 includes receiving the next game state from the lobby server at block 610. For example, the client application 104, illustrated in FIGS. 1 and 4, may receive the next game state. In the alternative, the game move may not get routed through the lobby server and may be sent directly to a respective game server that contains game logic to determine a next game state.

Figure 7:
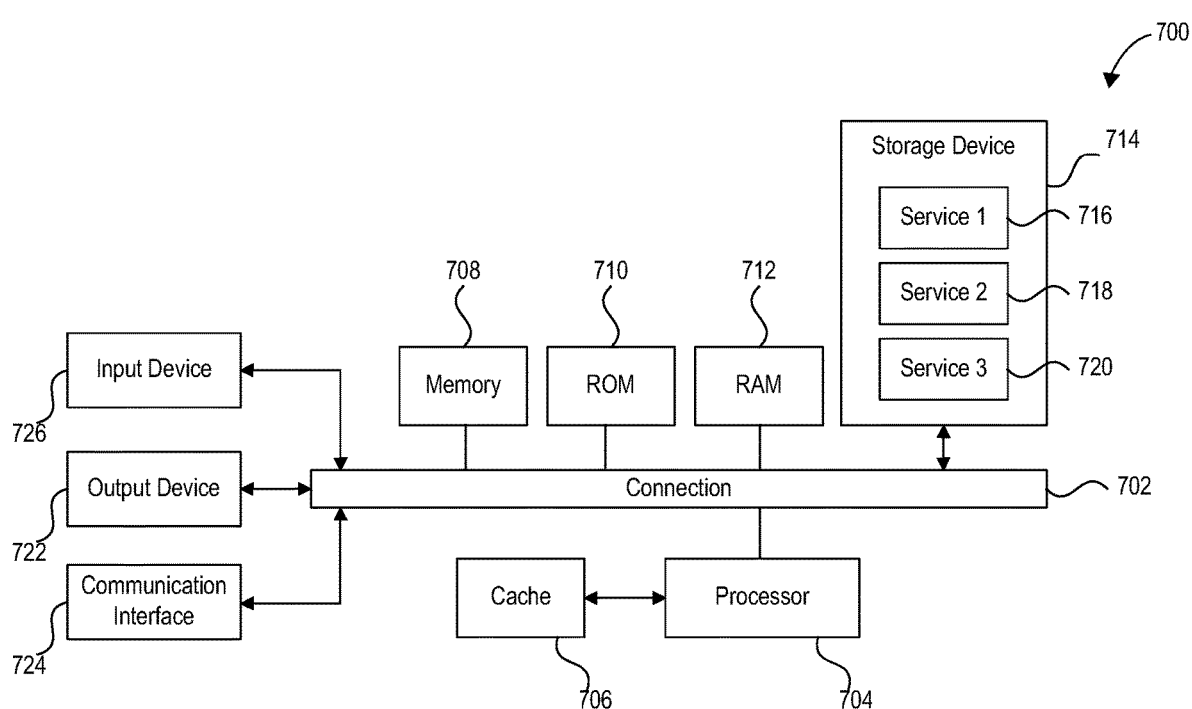
FIG. 7 shows an example of a system for implementing certain aspects of the present technology.

FIG. 7 shows an example of computing system 700, which can be for example any computing device making up client application 104, community hosting service 102, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a community server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A computer-implemented method comprising: sending, by a client application associated with a user account, a request to initiate a game, the request sent to a community server that supports near real-time communications between client applications associated with user accounts that are members of the community server, including the user account that is a member of the community server; initiating a websocket connection for the game between the client application and a lobby server associated with the community server, the websocket connection is configured to transmit data encoding game moves to the lobby server and data encoding game updates from the lobby server, wherein the lobby server stores code representing a latest game state of each pending game played by the members of the community server; and receiving, over the websocket connection, from the lobby server, the code used to generate a graphical static preview of the latest game state of each pending game.

Aspect 2. The computer-implemented method of Aspect 1, further comprising: sending data encoding a first game move to the lobby server that is forwarded to a first game server that contains game logic to determine a next game state; and receiving the next game state from the lobby server.

Aspect 3. The computer-implemented method of any of Aspects 1 to 2, wherein the pending games are played by the members of the community server through a voice channel associated with the community server.

Aspect 4. The computer-implemented method of any of Aspects 1 to 3, wherein a community hosting service is associated with a plurality of community servers including the community server, and each server is associated with multiple lobby servers and multiple game servers.

Aspect 5. The computer-implemented method of any of Aspects 1 to 4, wherein the code representing the game state for one or more of the pending games is stored as a character string.

Aspect 6. The computer-implemented method of any of Aspects 1 to 5, wherein the lobby server is associated with a unique lobby ID, and the game is associated with a game server and a respective unique game ID, wherein the unique lobby ID and the respective unique game ID are encoded in the data encoding game moves to route game moves through a correct lobby server and to a correct game server.

Aspect 7. The computer-implemented method of any of Aspects 1 to 6, further comprising: receiving, from a community hosting service, a token that authenticates the user account to join the game; and sending the token to the lobby server, wherein the lobby server uses the token to authenticate the user account based on a unique server ID generated by the community hosting service in association with the request.

Aspect 8. The computer-implemented method of any of Aspects 1 to 7, wherein the pending games played by the members of the community server use a shared protocol between the pending games and recognized by the lobby server.

Aspect 9. The computer-implemented method of any of Aspects 1 to 8, further comprising: receiving statistics and rankings associated with past and present game results to be displayed along with the graphical static preview.

Aspect 10. A non-transitory computer-readable medium comprising instructions, the instructions, when executed by a computing system, causes the computing system to: send, by a client application associated with a user account, a request to initiate a game, the request sent to a community server that supports near real-time communications between client applications associated with user accounts that are members of the community server, including the user account that is a member of the community server; initiate a websocket connection between the client application and a lobby server associated with the community server, the websocket connection is configured to transmit data encoding game moves to the lobby server and data encoding game updates from the lobby server, wherein the lobby server stores code representing a latest game state of each pending game played by the members of the community server; and receive, over the websocket connection, from the lobby server, the code used to generate a graphical static preview of the latest game state of each pending game.

Aspect 11. The non-transitory computer-readable medium of Aspect 10, wherein the instructions, when executed by the computing system, causes the computing system to: sending a game move to the lobby server that is forwarded to a respective game server that contains game logic to determine a next game state; and receiving the next game state from the lobby server.

Aspect 12. The non-transitory computer-readable medium of any of Aspects 10 to 11, wherein the pending games are played by the members of the community server through a voice channel associated with the community server.

Aspect 13. The non-transitory computer-readable medium of any of Aspects 10 to 12, wherein a community hosting service is associated with a plurality of community servers including the community server and each server is associated with multiple lobby servers and multiple game servers.

Aspect 14. The non-transitory computer-readable medium of any of Aspects 10 to 13, wherein the preview state for one or more of games is stored as a character string.

Aspect 15. The non-transitory computer-readable medium of any of Aspects 10 to 14, wherein the lobby server is associated with a unique lobby ID and the game is associated with a game server and a respective unique game ID that is used to route game moves through a correct lobby server and to a correct game server.

Aspect 16. The non-transitory computer-readable medium of any of Aspects 10 to 15, wherein the instructions, when executed by the computing system, causes the computing system to: receive, from a community hosting service, a token that authenticates the user account to join the game; and send the token to the lobby server, wherein the lobby server uses the token to authenticate the user account based on a unique server ID generated by the community hosting service in association with the request.

Aspect 17. The non-transitory computer-readable medium of any of Aspects 10 to 16, wherein the pending games played by the members of the community server use a shared protocol shared between the pending games and recognized by the lobby server.

Aspect 18. The non-transitory computer-readable medium of any of Aspects 10 to 17, wherein the instructions, when executed by the computing system, causes the computing system to: receive statistics and rankings associated with past and present game results to be displayed along with the graphical static preview.

Aspect 19. A system comprising: one or more processors; and a non-transitory computer-readable medium comprising instructions, the instructions, when executed by the one or more processors, causes the one or more processors to: send, by a client application associated with a user account, a request to initiate a game, the request sent to a community server that supports near real-time communications between client applications associated with user accounts that are members of the community server, including the user account that is a member of the community server; initiate a websocket connection between the client application and a lobby server associated with the community server, the websocket connection is configured to transmit data encoding game moves to the lobby server and data encoding game updates from the lobby server, wherein the lobby server stores code representing a latest game state of each pending game played by the members of the community server; and receive, over the websocket connection, from the lobby server, the code used to generate a graphical static preview of the latest game state of each pending game.

Aspect 20. The system of Aspect 19, wherein the instructions, when executed by the one or more processors, causes the one or more processors to: send a game move to the lobby server that is forwarded to a respective game server that contains game logic to determine a next game state; and receive the next game state from the lobby server.

What is claimed is:

1. A computer-implemented method comprising:
sending, by a client application associated with a user account, a request to initiate a game, the request sent to a community server that supports near real-time communications between client applications associated with user accounts that are members of the community server, including the user account that is a member of the community server;
initiating a websocket connection for the game between the client application and a lobby server associated with the community server, the websocket connection is configured to transmit data encoding game moves to the lobby server and data encoding game updates from the lobby server, wherein the lobby server stores code representing a latest game state of each pending game played by the members of the community server; and
receiving, over the websocket connection, from the lobby server, the code used to generate a graphical static preview of the latest game state of each pending game.

2. The computer-implemented method of claim 1, further comprising:
sending data encoding a first game move to the lobby server that is forwarded to a first game server that contains game logic to determine a next game state; and
receiving the next game state from the lobby server.

3. The computer-implemented method of claim 1, wherein the pending games are played by the members of the community server through a voice channel associated with the community server.

4. The computer-implemented method of claim 1, wherein a community hosting service is associated with a plurality of community servers including the community server, and each server is associated with multiple lobby servers and multiple game servers.

5. The computer-implemented method of claim 1, wherein the code representing the game state for one or more of the pending games is stored as a character string.

6. The computer-implemented method of claim 1, wherein the lobby server is associated with a unique lobby ID, and the game is associated with a game server and a respective unique game ID, wherein the unique lobby ID and the respective unique game ID are encoded in the data encoding game moves to route game moves through a correct lobby server and to a correct game server.

7. The computer-implemented method of claim 1, further comprising:
receiving, from a community hosting service, a token that authenticates the user account to join the game; and
sending the token to the lobby server, wherein the lobby server uses the token to authenticate the user account based on a unique server ID generated by the community hosting service in association with the request.

8. The computer-implemented method of claim 1, wherein the pending games played by the members of the community server use a shared protocol between the pending games and recognized by the lobby server.

9. The computer-implemented method of claim 1, further comprising:
receiving statistics and rankings associated with past and present game results to be displayed along with the graphical static preview.

10. A non-transitory computer-readable medium comprising instructions, the instructions, when executed by a computing system, causes the computing system to:
send, by a client application associated with a user account, a request to initiate a game, the request sent to a community server that supports near real-time communications between client applications associated with user accounts that are members of the community server, including the user account that is a member of the community server;

initiate a websocket connection between the client application and a lobby server associated with the community server, the websocket connection is configured to transmit data encoding game moves to the lobby server and data encoding game updates from the lobby server, wherein the lobby server stores code representing a latest game state of each pending game played by the members of the community server; and receive, over the websocket connection, from the lobby server, the code used to generate a graphical static preview of the latest game state of each pending game.

11. The non-transitory computer-readable medium of claim 10, wherein the instructions, when executed by the computing system, causes the computing system to:
sending a game move to the lobby server that is forwarded to a respective game server that contains game logic to determine a next game state; and
receiving the next game state from the lobby server.

12. The non-transitory computer-readable medium of claim 10, wherein the pending games are played by the members of the community server through a voice channel associated with the community server.

13. The non-transitory computer-readable medium of claim 10, wherein a community hosting service is associated with a plurality of community servers including the community server and each server is associated with multiple lobby servers and multiple game servers.

14. The non-transitory computer-readable medium of claim 10, wherein the preview state for one or more of games is stored as a character string.

15. The non-transitory computer-readable medium of claim 10, wherein the lobby server is associated with a unique lobby ID and the game is associated with a game server and a respective unique game ID that is used to route game moves through a correct lobby server and to a correct game server.

16. The non-transitory computer-readable medium of claim 10, wherein the instructions, when executed by the computing system, causes the computing system to:
receive, from a community hosting service, a token that authenticates the user account to join the game; and
send the token to the lobby server, wherein the lobby server uses the token to authenticate the user account based on a unique server ID generated by the community hosting service in association with the request.

17. The non-transitory computer-readable medium of claim 10, wherein the pending games played by the members of the community server use a shared protocol shared between the pending games and recognized by the lobby server.

18. The non-transitory computer-readable medium of claim 10, wherein the instructions, when executed by the computing system, causes the computing system to:
receive statistics and rankings associated with past and present game results to be displayed along with the graphical static preview.

19. A system comprising:
one or more processors; and
a non-transitory computer-readable medium comprising instructions, the instructions, when executed by the one or more processors, causes the one or more processors to:
send, by a client application associated with a user account, a request to initiate a game, the request sent to a community server that supports near real-time communications between client applications associated with user accounts that are members of the community server, including the user account that is a member of the community server;
initiate a websocket connection between the client application and a lobby server associated with the community server, the websocket connection is configured to transmit data encoding game moves to the lobby server and data encoding game updates from the lobby server, wherein the lobby server stores code representing a latest game state of each pending game played by the members of the community server; and
receive, over the websocket connection, from the lobby server, the code used to generate a graphical static preview of the latest game state of each pending game.

20. The system of claim 19, wherein the instructions, when executed by the one or more processors, causes the one or more processors to:
send a game move to the lobby server that is forwarded to a respective game server that contains game logic to determine a next game state; and
receive the next game state from the lobby server.

* * * * *